Patented Dec. 24, 1940

2,225,684

UNITED STATES PATENT OFFICE 2,225,684

SOLID LUBRICANT

Martin B. Chittick, Chicago, Ill., assignor to The Pure Oil Company, Chicago, Ill., a corporation of Ohio No Drawing. Application August 8, 1933, Serial No. 684,235

15 Claims. (Cl. 252—35)

This invention relates to solid lubricants for lubricating heavy bearing surfaces where high pressures, high speeds, and high temperatures are encountered. The invention contemplates a normally solid extreme pressure lubricant, relatively free from moisture and sufficiently solid to be cut or molded into different sizes and shapes as may be required for various shaped bearings and lubricant containers; such lubricants comprising soaps and sulfurized oils, said oils including fatty and hydrocarbon polymer oils and more specifically lubricants comprising coacting ingredients including a soap, mineral oil, and sulfurized polymers, such polymers prior to sulfurization being of the unsaturated type produced from petroleum hydrocarbons; such solid lubricants being capable of giving a film with a load carrying capacity of the order of 40,000 pounds per square inch; all as hereinafter described and claimed.

Under present day industrial conditions, equipment in the industries is being subjected more and more to demands for increased pressures, speeds and temperatures where bearing surfaces are involved, and the lubricants of the prior art are not entirely satisfactory to meet these demands for more severe operating conditions. In general, a lubricant is only as good as the lubricating oil which it may contain, and ordinary mineral oil shows load carrying ability of about 10,000 to 12,000 pounds per square inch, as determined on the Almen, Timken or Floyd apparatus. The applicant has solved a major problem in providing a grease which will lubricate under extreme loads and under severe conditions. Furthermore, the lubricants of the prior art often contain amounts of water which are deleterious to high temperature operations because of formation of steam due to the generation of heat in heavy high speed bearings; and also due to the acceleration of corrosion by corrosive agents on the bearing metals by the presence of moisture on water. The disadvantage of moisture on high speed lubricants is known, and proposals have been made to dehydrate lubricating grease containing sodium soap and cylinder stock.

The present invention contemplates a grease which is also relatively free from moisture (trace to 0.5%) for high temperature, pressure, and high speed use and which contains a substantial amount of combined sulfur linked to a previously unsaturated polymerized hydrocarbon, and combined with a soap; and particularly, for a grease to be exposed to severe operating conditions of temperature, pressure and extreme load. The applicant has discovered that the grease of the present invention gives a film which has a load carrying capacity approximately four times as much as the load carrying capacity of a film of ordinary mineral oil. Furthermore, the applicant has discovered that the grease of the present invention has no ill corrosive effects on bearing surfaces operated under extreme conditions, despite the fact that it contains combined sulfur.

The following formula is representative of a grease of the present invention, but is by no means restrictive, as proportions may be varied so long as the characteristics and properties are not departed from in a substantial manner:

| | Per cent |
|---|---|
| Fatty oils | 38.0 |
| Caustic soda | 5.2 |
| Sulfurized lubricant | 10.0 |
| Mineral oil | 46.8 |

The grease of the above formula shows the following tests:

| | |
|---|---|
| Soda soap | per cent 42.36 |
| Mineral oil | do 49.30 |
| Combined sulfur | do .90 |
| Moisture | Trace |
| Free alkali as NaOH | per cent .11 |
| Ash | do 9.2 |
| Unworked consistency (A. S. T. M.) | 35 |
| Melting point | degrees 447 |

The fatty oils referred to embrace either animal or vegetable oils, hydrogenated oils, or fatty acids. Examples of fatty acids are stearic acid, palmitic acid.

It will be clear that the invention is intended to cover other soaps either with or without the soda soap given. Calcium soaps, aluminum soaps, lead soaps, etc. are representative, and may be used singly or in combination.

Industrial requirements, as is well known, call for a wide variety of consistencies of the finished lubricant. These consistencies are obtained by varying the ratio of soap to liquid constituents. The ratio of soap to liquid in the example given can therefore be altered within the scope and spirit of the invention, so long as the results of the invention are not departed from.

The sulfurized lubricant which is set forth in the above example is produced by chemically combining sulfur with hydrocarbon polymers. These polymers are synthetic products of high molecular weight produced from gasoline-like hydrocarbons of low molecular weight of olefinic character by the action of polymerizing agents, such as sulphuric acid, fuller's earth, etc. These polymers ordinarily have an iodine number of 50 to 200 and an A. P. I. gravity of 6 to 20. When sulfurized, these polymers form good "cutting" oils, as explained and described and claimed in my co-pending application, Ser. No. 575,953, filed November 18, 1931, now matured into Patent No. 2,181,964 and of which this application is a continuation-in-part.

The polymers prior to sulfurization may be produced by cracking light fractions of mineral oil. Cracking of petroleum oil in the vapor phase at temperatures of the order of 1000° F. is productive of unsaturated polymers which are utilized to be combined with sulfur to form the sulfurized lubricant, which is one of the essential ingredients of the grease of the present invention.

The polymers are sulfurized preferably in the following manner:

The polymers, either alone, or with up to an equal volume of mineral oil, are placed in suitable kettle or vessel to which heat can be applied, and the contents agitated. Agitation is started and a pre-determined quantity of sulfur slowly added and thoroughly mixed at room temperature. At this point, a small amount (about 10%) of sulfur chloride may be added to act as a catalyst and accelerate the reaction. Heat is then applied while the mixture is agitated and continued until completion of the reaction. The temperature should not be permitted to reach a point (about 250° F.) where large quantities of hydrogen sulfide are evolved. It is also satisfactory to add the sulfur after heat has been applied.

The sulfurized polymers are combined with the other elements above enumerated to form a grease in the following preferred procedure:

Such preferred procedure for producing the grease resides in charging the fatty oils to a kettle or other suitable vessel, provided with agitation and means of heating, and adding a substantially equal volume of mineral oil. Heat is then applied and the mass agitated while slowly adding the caustic soda in water solution. Heating and agitation is then continued until the fatty oils are saponified and all water has been drawn off. The balance of the mineral oil is then added, followed by the sulfurized lubricant. The mass is then drawn off into suitable containers.

It will be understood that variations of this procedure can be made to obtain desired results and provide for other soaps, such as calcium and aluminum soaps.

It is also within the range of the invention to employ a sulfurized fatty oil as a substitute for the sulfurized polymers, and the procedure for making the former is essentially the same as employed for the latter and as defined above.

Wherever the term "sulfurized" is used in this specification, it is meant to define the chemical combination of sulfur with hydrocarbon polymers or other oils that may be designated.

What is claimed is:

1. A solid extreme pressure lubricant comprising sulfurized unsaturated hydrocarbon polymers and a soap.

2. A grease containing unsaturated petroleum polymerized hydrocarbons which have been sulfurized, a viscous hydrocarbon oil, and a soap.

3. A grease lubricant according to claim 1 including a soap of the group consisting of calcium, aluminum, lead and sodium.

4. A high pressure grease normally in the solid state having a moisture content within the range from a trace to 0.5% and having characteristics of a composition produced from the following formula:

| | Per cent |
|---|---|
| Fatty oils | 38.0 |
| Caustic soda | 5.2 |
| Sulfurized unsaturated hydrocarbon polymer | 10.0 |
| Mineral oil | 46.8 |

5. A grease which does not disintegrate at temperature of the order of 212° F. and which comprises a sulfurized previously unsaturated polymerized hydrocarbon, a soap, and mineral oil, and having a load carrying capacity when filmed on metal of the order of 40,000 pounds per square inch.

6. A lubricant of the class described, comprising sulfur chemically combined with hydrocarbon polymers of the unsaturated type produced by vapor phase cracking of mineral oil, mineral oil, and soap.

7. A solid lubricant comprising soap and sulfurized unsaturated hydrocarbon polymers having the iodine number and specific gravity of polymers obtained from the polymerization of cracked petroleum distillates.

8. A solid lubricant comprising soap and sulfurized unsaturated hydrocarbon polymers having the iodine number and specific gravity of polymers obtained from the polymerization of vapor phase cracked petroleum distillates.

9. A solid lubricant comprising soap and sulfurized unsaturated hydrocarbon polymers having the iodine number and specific gravity of polymers obtained from the catalytic polymerization of cracked petroleum distillates.

10. A solid lubricant comprising soap and sulfurized unsaturated hydrocarbon polymers having the iodine number and specific gravity of polymers obtained from the treatment of cracked petroleum distillates with fuller's earth.

11. A solid lubricant comprising soap and sulfurized unsaturated hydrocarbon polymers having the iodine number and specific gravity of polymers obtained from polymerization of light unsaturated hydrocarbons.

12. A lubricant comprising soap and the product resulting from the sulfurization of highly unsaturated hydrocarbon polymers at elevated temperatures not in excess of about 250° F.

13. A lubricant of which the major part is a mineral oil and minor portions of a soap and the product resulting from the sulfurization of highly unsaturated hydrocarbon polymers at elevated temperatures not in excess of about 250° F.

14. A lubricant comprising soap and the product resulting from the sulfurization of highly unsaturated hydrocarbon distillate polymers at elevated temperatures not in excess of about 250° F.

15. A lubricant of which the major part is a mineral oil and minor portions of a soap and the product resulting from the sulfurization of highly unsaturated hydrocarbon distillate polymers at elevated temperatures not in excess of about 250° F.

MARTIN B. CHITTICK.